United States Patent Office 3,423,325
Patented Jan. 21, 1969

3,423,325
TERBIUM OR TERBIUM AND GADOLINIUM ACTIVATED MIXED ALKALINE EARTH ALKALI METAL BORATE LUMINESCENT SUBSTANCE
Willem Lambertus Wanmaker and Johannes Godefridus Verlijsdonk, Emmasingel, Eindhoven, Netherlands, assignors to North American Philips Company, Inc., New York, N.Y., a corporation of Delaware
No Drawing. Filed Aug. 10, 1965, Ser. No. 478,728
Claims priority, application Netherlands, Aug. 11, 1964, 6,409,208
U.S. Cl. 252—301.4         3 Claims
Int. Cl. C09k 1/04

ABSTRACT OF THE DISCLOSURE

Terbium or terbium and gadolinium activated mixed alkaline earth and alkali metal borate green luminescent phosphors.

---

The invention relates to a luminescent screen and to a luminescent substance for example for use in cathode-ray tubes, gas-discharge lamps, X-ray screens and lasers. The invention furthermore relates to a radiation source comprising such a luminescent screen.

For many uses luminescent substances are desired which convert electromagnetic or corpuscular radiation into light. In accordance with the use it will be appreciated to obtain a broad spectrum or a spectrum having emissions restricted to one or more waveranges. For practically all uses high efficiency of conversion is always desired. Sometimes also the lumen maintenance of the luminescent substance with respect to temperature is important, which is to be understood to mean the relationship between the temperature of the substance and the light output. With some uses, for example in high-pressure discharge lamps, the luminescent screen is located at an area where the temperature in operation is high, for example 300° C. to 600° C. It is desirable also at these high temperatures for the light emission of the luminescent screen to be high. Many known luminescent substances do not fulfill the last-mentioned requirement. They often have a satisfactory light output at room temperature, but this output drops strongly at an increase in temperature, particularly if the temperature exceeds 100° C. Some known red-luminescent substances having a satisfactory lumen maintenance with respect to temperature, are manganese-activated fluorgermanates of magnesium and manganese-activated lithium-containing arsenates of magnesium.

A luminescent screen according to the invention is characterized in that it contains a mixed borate of at least one of the alkaline-earth metals calcium, strontium, barium or magnesium and at lest one of the alkali metals lithium, sodium or potassium, activated with terbium and, if desired, with gadolinium, the ratio of the over-all quantity of atoms of alkali-earth metal and of the alkali metal together to the quantity of boron trioxides lies between the values of 1:2 and 4:1 and the over-all quantity of activator is 0.02 to 0.4 gm. at. per mol boron trioxide.

The ratio between the number of atoms of the alkali-earth metal and the number of atoms of alkali metal lies preferably between 10:1 and 1:3.

The luminescent borates used in a screen according to the invention display green luminescence; upon detailed observation this green light is found to consist of strong emissions in a number of restricted waveranges. The maxima of these restricted waveranges are located at different wavelengths; the strongest emission peak is found at about 545 m$\mu$. Owing to this pronounced green colour of the emitted radiation the borates according to the invention by themselves are not too suitable for general illumination purposes; however, they may be employed in a mixture with luminescent substances emitting radiation in other regions of the spectrum, so that together with the green emission of the borates according to the invention substantially white light is produced. The most important uses are found, however, where a radiation in a very restricted waverange is desired. Mention may be made of the use for photoprinting lamps, lasers, plant irradiators and cathode-ray tubes for the reproduction of colour pictures.

Since many borates according to the invention display a particularly satisfactory lumen maintenance with respect to temperature they may be used with particular success in a radiation source consisting of the combination of a high-pressure mercury-vapour discharge tube and a bulb surrounding said tube, on which luminescent material is provided. It is known that a fairly large portion of the electric energy supplied to a high-pressure mercury-vapour discharge lamp is converted into heat, which is irradiated by the tube. As a result the temperature of the bulb surrounding the discharge tube increases. In dependence upon the size of the bulb and upon the wattage of the discharge tube, the temperature usually lies between 300° C. and 600° C. The smaller the bulb, the higher will be the temperature with the same wattage. With a smaller bulb use will preferably be made of a luminescent substance having a better lumen maintenance than with a bulb of larger diameter.

Since the borates according to the invention emit only green radiation, high-pressure mercury-vapour discharge lamps with a bulb provided only with a borate according to the invention are, in general, not suitable for normal illumination purposes. They are, however, particularly suitable for photoprinting purposes and other special applications for example for affecting chemical reactions or for irradiation of plants. Particularly with the last-mentioned uses the lamps are often enclosed in small spaces, so that they readily assume a high temperature. In this case a satisfactory lumen maintenance with regard to temperature is of high importance.

Since the borates have low melting points, they may also be successfully used as laser material, since they can be readily shaped in the desired form.

The quantity of activator is preferably chosen between 0.03 and 0.3 gm. at./mol boron trioxide, since then the highest light outputs are obtained.

The use of gandolinium has the advantage that the quantity of terbium may be less great. A great quantity of terbium may give rise to concentration quenching. By adding gadolinium higher light outputs may be obtained. The colour of the emitted radiation is substantially not varied by the use of gadolinium. Apparently gadolinium provides a transfer of excitation energy to the terbium. An additional advantage of the use of gadolinium is that the cost price of the borates is lower. Gadolinium is considerably cheaper than terbium. The quantity of gadolinium preferably lies between 0.05 and 0.25 gm. at./mol boron trioxide.

In the following Tables I and II there is given a number of examples of mixtures of alkali-earth carbonates and alkaline carbonates from which by heating with the activators usually added in form of oxides the luminescent, mixed borates according to the invention are obtained. The tables indicate the employed quantity of activator in atoms. The relative light output (L.O.) is given at 25° C. and the light output measured at 400° C. and 500° C. is given as a percentage of the light output at 25° C. The light output at 25° C. was measured with respect to a standard luminescent powder consisting of manganese- and antimony-activated calcium halophosphate mixed with calcium carbonate so that the light output was reduced to 54% of the initial light output of the calcium halophosphate. All measurements were carried out at an excitation of the luminescent borates by a radiation of a wavelength of 254.7 mμ.

tinued in air for further two hours, the result being the luminescent substance. In some cases it is desirable to pulverise the resultant product after heating and to reheat it in air for two hours. If necessary this process is repeated again. Heating is preferably performed at a temperature closely below the melting point of the borates.

The mixed borates of the other alkaline and alkali-earth metals in the compositions indicated in the tables may be produced in a similar manner. The quantities in grams are, of course, calculated on the basis of the molecular ratios of the tables.

TABLE I

| Mol. composition | | | | | | | | | | L.O. at 25° C. | L.O. to L.O. at 25° C. at— | |
|---|---|---|---|---|---|---|---|---|---|---|---|---|
| $CaCO_3$ | $SrCO_3$ | $BaCO_3$ | $MgCO_3$ | $Li_2CO_3$ | $Na_2CO_3$ | $K_2CO_3$ | $B_2O_3$ | Tb | Gd | | 400° C. | 500° C. |
| 1.82 | | | 0.91 | | | | 1.00 | 0.06 | 0.06 | 58 | 115 | 104 |
| 1.82 | | | | | 0.91 | | 1.00 | 0.06 | 0.06 | 144 | 80 | 58 |
| 1.88 | | | | | | 0.94 | 1.00 | 0.06 | | 75 | 55 | 34 |
| | | 1.88 | | 0.94 | | | 1.00 | 0.06 | | 65 | 99 | 81 |
| | | | 1.88 | | 0.94 | | 1.00 | 0.06 | | 136 | 81 | 70 |
| 1.63 | | | | 0.25 | 0.94 | | 1.00 | 0.06 | | 172 | 88 | 74 |
| 1.88 | | | | 0.47 | | 0.47 | 1.00 | 0.06 | | 152 | 89 | 97 |
| 1.88 | | | | 0.31 | 0.31 | 0.31 | 1.00 | 0.06 | | 171 | 83 | 91 |
| 0.54 | | | | | 0.27 | | 1.00 | 0.06 | | 40 | 135 | 139 |
| 1.22 | | | | | | 0.61 | 1.00 | 0.06 | | 103 | 95 | 88 |
| 1.22 | | | | | 0.61 | | 1.00 | 0.06 | | 94 | 137 | 136 |
| 1.82 | | | | | 0.91 | | 1.00 | 0.12 | | 197 | 90 | 82 |
| 1.70 | | | | | 0.85 | | 1.00 | 0.23 | | 192 | 80 | 60 |
| 1.44 | | | | | 0.72 | | 1.00 | 0.49 | | 128 | 87 | 77 |
| 1.67 | | | | | 0.835 | | 1.00 | 0.015 | 0.12 | 118 | 70 | 47 |
| | 1.88 | | | | 0.94 | | 1.00 | 0.06 | | 108 | 29 | 18 |

TABLE II

| Mol. composition | | | | L.O. at 25° C. |
|---|---|---|---|---|
| $CaCO_3$ | $Na_2CO_3$ | $B_2O_3$ | Tb | |
| 2.70 | 0.12 | 1.00 | 0.06 | 56 |
| 2.58 | 0.24 | 1.00 | 0.06 | 74 |
| 2.34 | 0.48 | 1.00 | 0.06 | 107 |
| 2.10 | 0.72 | 1.00 | 0.06 | 169 |
| 1.98 | 0.84 | 1.00 | 0.06 | 183 |
| 1.86 | 0.96 | 1.00 | 0.06 | 195 |
| 1.74 | 1.08 | 1.00 | 0.06 | 202 |
| 1.62 | 1.20 | 1.00 | 0.06 | 225 |
| 1.41 | 1.41 | 1.00 | 0.06 | 186 |

From the tables it will be seen that some substances display, at higher temperatures, a higher light output than at 25° C. It furthermore appears from the tables that the light output of some substances drops fairly strongly at the higher temperatures; since some substances have a very high relative light output at 25° C., this strong drop need sometimes not have a disturbing effect. The product of the light decrease and the relative light output at 25° C. is conclusive for each use. Since the light output at 25° C. can often be raised by an improved method of manufacture, the possibility is not excluded that the borates according to the invention display a considerably higher light output than the values indicated in the tables.

In order to give the impression of a method of producing a substance according to the invention, there follows an example of the production of calcium lithium borate, activated with terbium and gadolinium, as indicated in the first line of Table I.

EXAMPLE

A mixture of:

3.64 gms. of $CaCO_3$
1.48 gms. of $Li_2CO_3$
2.50 gms. of $H_3BO_3$
0.23 gm. of $Tb_4O_7$
0.22 gm. of $Gd_2O_3$ is made and heated in a crucible of ceramic material for some time at a temperature of 600° C. to 700° C. for expelling the water from the $H_3BO_3$. Then heating is con-

What is claimed is:

1. A luminescent substance consisting essentially of a mixed borate of at least one alkaline earth metal borate and at least one alkali metal borate wherein the ratio of the total number of atoms of the alkaline earth metals and the alkali metals to the number of atoms of boron trioxide is between 4:1 and 1:2 inclusive, the ratio of the number of atoms of the alkaline earth metals to the number of atoms of the alkali metal is between 10:1 and 1:3 inclusive and wherein said luminescent substance is activated by at least one activator selected from the group consisting of terbium and mixtures of terbium with gadolinium, the minimum concentration of terbium being 0.02 atom/mol of boron trioxide and the maximum concentration of the activator being 0.4 atom/mol of boron trioxide.

2. The luminescent material of claim 1 wherein the minimum concentration of terbium is at least 0.03 atom/mol of boron trioxide and the maximum concentration of the total amount of the activator is 0.3 atom/mol of boron trioxide.

3. The luminescent material of claim 2 wherein gadolinium is present in a concentration of 0.05 atom to 0.25 atom/mol of boron trioxide.

References Cited

Kroger: Some Aspects of the Luminescence of Solids, 1948, p. 297.

TOBIAS E. LEVOW, *Primary Examiner.*

ROBERT D. EDMONDS, *Assistant Examiner.*

UNITED STATES PATENT OFFICE
CERTIFICATE OF CORRECTION

Patent No. 3,423,325　　　　　　　　　　　　　　January 21, 1969

Willem Lambertus Wanmaker et al.

It is certified that error appears in the above identified patent and that said Letters Patent are hereby corrected as shown below:

Column 1, line 53, "lest" should read -- least --. Column 3, line 2, "254.7" should read -- 253.7 --.

Signed and sealed this 14th day of April 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents